(12) United States Patent
Park et al.

(10) Patent No.: US 9,094,746 B2
(45) Date of Patent: Jul. 28, 2015

(54) BLOCK RESISTANT MICROPHONE PORT DESIGN

(71) Applicant: QUALCOMM Incorporated, San Diego, CA (US)

(72) Inventors: Hyun Jin Park, San Diego, CA (US); Wade L. Heimbigner, Poway, CA (US); Joseph R. Fitzgerald, San Diego, CA (US); Mark A. Cherry, San Diego, CA (US); Terry Lee Rickman, Coronado, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 81 days.

(21) Appl. No.: 13/741,134

(22) Filed: Jan. 14, 2013

(65) Prior Publication Data
US 2014/0161297 A1    Jun. 12, 2014

Related U.S. Application Data

(60) Provisional application No. 61/734,282, filed on Dec. 6, 2012.

(51) Int. Cl.
*H04R 9/08* (2006.01)
*H04R 1/02* (2006.01)
*H04M 1/00* (2006.01)
*H04M 9/00* (2006.01)
*H04M 1/03* (2006.01)
*H04M 1/02* (2006.01)
*H04R 1/28* (2006.01)
(Continued)

(52) U.S. Cl.
CPC ............... *H04R 1/02* (2013.01); *H04M 1/026* (2013.01); *H04M 1/035* (2013.01); *H04R 1/2884* (2013.01); *G06F 1/1684* (2013.01); *H04R 1/406* (2013.01); *H04R 3/005* (2013.01); *H04R 2499/11* (2013.01)

(58) Field of Classification Search
CPC ...... H04R 1/02; H04R 1/086; H04R 2410/07; H04R 2499/11; H04M 1/03; H04M 1/035; H04M 1/026; B60R 11/0247
USPC .................. 381/91, 189, 359, 360, 365, 395; 455/575.1, 575.8
See application file for complete search history.

(56) References Cited

U.S. PATENT DOCUMENTS

| 4,463,222 | A |   | 7/1984 | Poradowski |         |
|-----------|---|---|--------|------------|---------|
| 5,442,713 | A | * | 8/1995 | Patel et al. | 381/357 |

(Continued)

FOREIGN PATENT DOCUMENTS

GB         2213678 A       8/1989

OTHER PUBLICATIONS

Motorola, "Motorola Talkabout (R) Two-Way Radio User's Guide", 2010, Motorola, MC Series, all pages.*

(Continued)

*Primary Examiner* — Jesse Elbin
(74) *Attorney, Agent, or Firm* — Knobbe Martens Olson & Bear LLP

(57) ABSTRACT

A microphone port design for a handheld device is disclosed. The microphone port design includes an elongated channel disposed in a first surface of the handheld device. A microphone port is located within the channel to reduce unwanted noise caused by air pressure build up around the microphone port opening due to coverage of the opening by a user's finger.

21 Claims, 10 Drawing Sheets

(51) Int. Cl.
*G06F 1/16* (2006.01)
*H04R 1/40* (2006.01)
*H04R 3/00* (2006.01)

(56) References Cited

U.S. PATENT DOCUMENTS

| | | | |
|---|---|---|---|
| 5,832,079 A * | 11/1998 | Rabe | 379/433.13 |
| 7,369,664 B2 | 5/2008 | Kargus, IV et al. | |
| 7,570,772 B2 | 8/2009 | Sorensen et al. | |
| 7,627,132 B2 | 12/2009 | Anderson | |
| 8,009,851 B2 * | 8/2011 | De Pooter et al. | 381/359 |
| 2006/0188114 A1 | 8/2006 | Wong | |
| 2009/0245564 A1 * | 10/2009 | Mittleman et al. | 381/361 |
| 2011/0200205 A1 | 8/2011 | Tokuda | |
| 2011/0226545 A1 | 9/2011 | Richardson et al. | |
| 2012/0106755 A1 | 5/2012 | Zhang | |
| 2013/0064390 A1 * | 3/2013 | Dinh et al. | 381/91 |
| 2013/0264143 A1 * | 10/2013 | Richardson et al. | 181/202 |

OTHER PUBLICATIONS

Partial International Search Report—PCT/US2013/069119 ISAEPO Oct. 13, 2014.

International Search Report—PCT/US2013/069119 ISAEPO Feb. 6, 2015.

\* cited by examiner

BLOCK RESISTANT MICROPHONE PORT DESIGN

CROSS-REFERENCE TO RELATED APPLICATIONS

The application claims the priority benefit of U.S. Provisional Application No. 61/734,282, entitled "BLOCK RESISTANT MICROPHONE PORT DESIGN," filed Dec. 6, 2012, the entirety of which is incorporated herein by reference.

TECHNICAL FIELD

The systems and devices disclosed herein relate generally to microphone ports, and more particularly, to configurations of microphone ports that minimize noise generated by contact against the port.

BACKGROUND

Electronic devices may, at times, be used in circumstances in which the microphone is subject to transient or sustained airflow or air pressure disturbances, such as "popping" pressure changes or wind noise. In certain conditions, airflow or pressure changes incident upon the microphone may be so substantial as to be picked up by the microphone and produce an undesirable noise signal that interferes with the microphone's use and provides an unpleasant and distracting noise to the user. During a phone call, for example, audible airflow noise may make sound transmissions difficult to hear on the part of a listener.

Typically, several types of omni-directional microphones have been used in portable electronic devices. Although omni-directional microphones are considered to be less sensitive to wind-noise from air blowing into the microphone as compared to directional microphones, wind-noise or scratching due to coverage of the microphone port often remains problematic. Noise-cancelling algorithms may be used to combat the problem and improve acoustical performance; however, such electronic solutions require power consumption and are not always suitable in electronic devices having limited battery capacity, such as cell phones and tablets.

Furthermore, conventional microphone port designs can include small openings that may be easily covered up by a hand or finger of the user. Covering the microphone port may trap air at the microphone port opening. This trapped air within the microphone port can lead to air vibrations within the port that result in loud scratching noises that are undesirable to the user and may result in low-quality microphone recordings or transmissions.

SUMMARY

In order to address these considerations, embodiments disclosed herein relate to handheld device case design, particularly the design of the microphone port opening in the case. In one aspect, an elongated cutout or recessed trench is formed in the handheld device case that is longer than the width of a human index finger. Therefore, air may be allowed to escape from the area surrounding the microphone port opening, minimizing the risk of undesired pressure changes near the microphone port opening that may cause unwanted scratching or popping noises.

In one embodiment, a handheld electronic device includes a first surface comprising at least one elongated channel having a length, a width, and a depth such that the length is greater than the width and at least one microphone port located within the channel such that the microphone port is located below the level of the first surface. The channel is configured to allow air vibrations to escape from within the elongated channel if the elongated channel is contacted by a user's finger.

In another embodiment, a handheld device includes a first surface having a first elongated channel oriented along a first axis of the device and a second elongated channel oriented along a second axis of the device such that the first channel and the second channel intersect. The device further includes a first microphone port located within the channels at the point of intersection of the channels, a second microphone port located within the first elongated channel, and a third microphone port located within the second elongated channel.

In yet another embodiment, an electronic device includes a first surface, means for positioning a first microphone port opening below the first surface, means for positioning a second microphone port opening below the first surface, and means for locating a third microphone port opening below the first surface.

DETAILED DESCRIPTION

Microphone Port Design Overview

Implementations disclosed herein provide devices and apparatus for a microphone port design for a handheld device or other electronic device. A handheld device may be a handset, a tablet, a phone, a smart phone, a portable electronic device, an electronic notepad, and/or a personal digital assistant (PDA). The handheld device may be able to communicate with other devices via a cellular network and/or other communication networks. The microphone port design may be used to reduce undesired scratching noises produced when the microphone port is fully covered by a hand, finger, skin, clothing, or other surface or material. In one aspect, the microphone port may be placed in a long, narrow, and shallow channel that cannot be easily entirely covered by an average human finger. When the microphone port is placed within such a channel, air vibrations can escape around the overlying finger and into the surrounding atmosphere. The air is therefore not trapped at the microphone port opening which thereby reduces noise from entering the microphone. Trapped air vibrations can cause loud scratching noises that are undesirable to the user and may result in low-quality microphone recordings or transmissions.

In some aspects, the channel may have a length of approximately one inch with a width and a depth each of approximately $1/10^{th}$ of an inch. In other aspects, the channel may have a length of approximately 13.3 mm or approximately ½ of an inch. In some embodiments, the microphone port may be located within the channel, with the opening of the port disposed below the outer surface of the case of the handheld device, as shown in the following figures. The microphone port could be centered within the channel or disposed to either side of the channel. Additionally, one or more intersecting channels may be configured with one or more microphone ports disposed within the intersecting channels.

For example, in some embodiments, the channels may intersect and form an "X" or "+" shape in the electronic device. In such embodiments, one or more microphones may be disposed in the trench so that they are protected from contact by a user's finger or other object. In some embodiments, two or three microphones are disposed within the intersecting trenches.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Figure 1B:
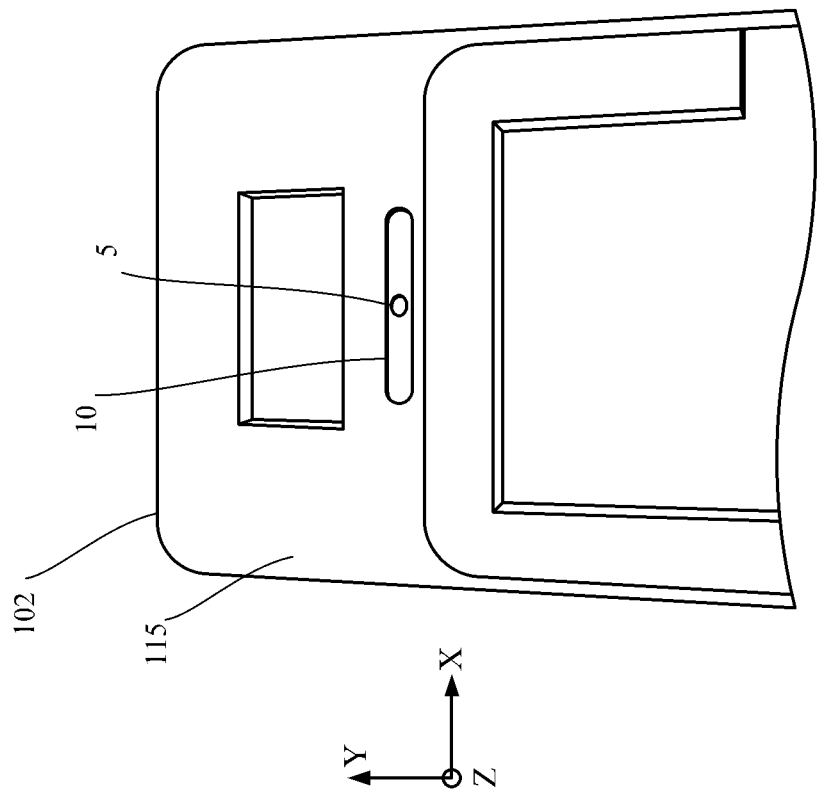
FIG. 1B is a schematic drawing illustrating a partial view of a case for an electronic device having a microphone port design according to one embodiment of the present invention.
Figure 1A:
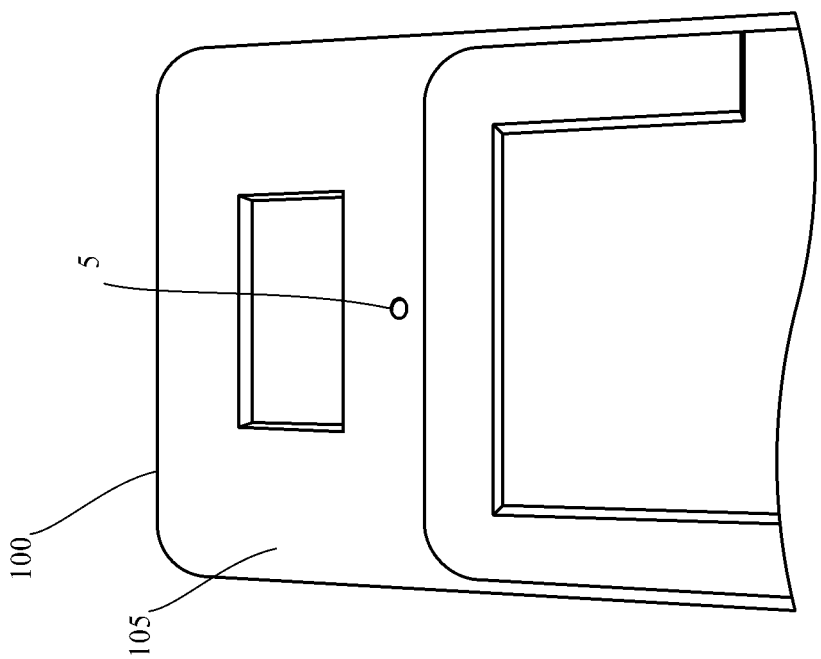
FIG. 1A is a schematic drawing illustrating a partial view of a prior art case for an electronic device having a conventional microphone port design.

Conventional microphone port placement within an electronic device is shown in FIG. 1A. An electronic device 100 has a rear surface 105 in which is disposed a microphone port opening 5. The microphone port 5 conventionally is a small hole above the microphone located within the electronic device 600.

In contrast to the device of FIG. 1A, one embodiment of microphone port placement within a recessed channel is shown in FIG. 1B. In this figure, an electronic device 102 has a rear surface 115 which includes a microphone port opening 5 disposed within a recessed channel 10 according to one implementation. As will be discussed in greater detail, the channel may have a width greater than the microphone port opening 5.

Figure 2A:
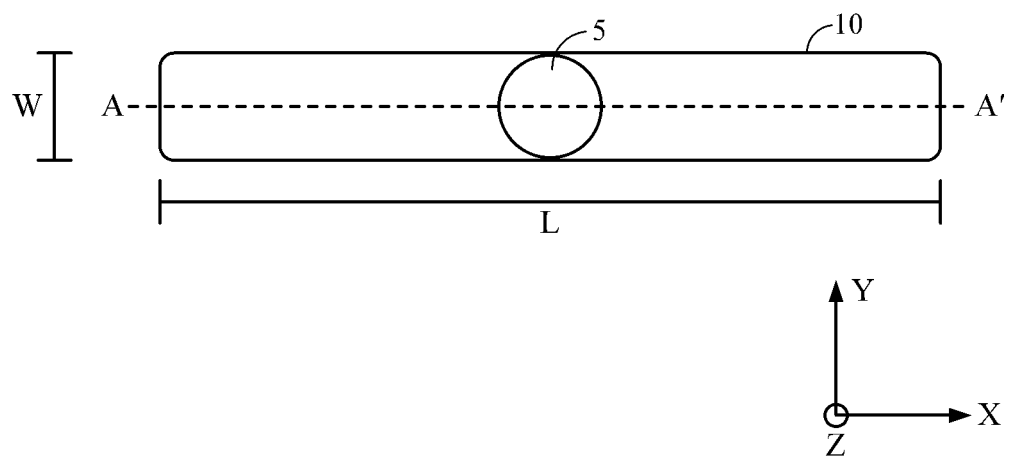
FIG. 2A is a schematic drawing illustrating a top view of one embodiment of a microphone port design.

As shown in FIG. 2A, a microphone port design for an electronic device includes a microphone port opening 5 and a recessed channel 10. The recessed channel may have a length L and a width W as seen in the top or overhead view of the channel seen in FIG. 2A. The recessed channel 10 may have a length L longer than the width of an average human index finger. In some embodiments, the length L may be between about 0.75 inch and 1 inch. In other embodiments, the length L may be between 10 mm and 15 mm or between 10 mm and 25 mm. The recessed channel 10 may have a width W less than the length L. In some embodiments, the width W may be approximately $1/10^{th}$ of an inch. In other embodiments, the width W may be no greater than about ¼ of an inch.

In the illustrated embodiment, the microphone port opening 5 is located approximately in the middle of the length L of the recessed channel 10. In other embodiments, the microphone port opening 5 may be disposed at any position along the length L of the channel 10 from the left edge to the right edge. The microphone port opening 5 may be shaped as a circle, ellipse, rectangle, square, or other shape. FIG. 2A illustrates a circular microphone port opening 5 having a diameter approximately equal to the width W of the channel.

Figure 2B:
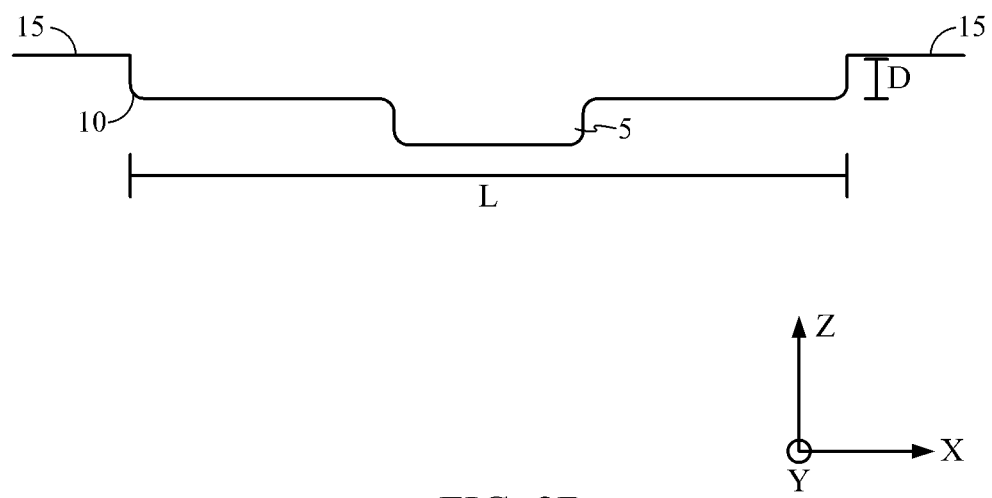
FIG. 2B is a schematic drawing illustrating a side cross-sectional view of the embodiment shown in FIG. 2A.

A side cross-sectional view along line A-A' of the microphone port design of FIG. 2A is shown in FIG. 2B. The channel 10 is recessed a depth D from the outer surface 15 of the electronic device. In some embodiments, the depth D may be approximately the same as the width W. In other embodiments, the depth D may be larger or smaller than the width W. The microphone port opening 5 may be flush with the recessed surface of the channel. In other embodiments, such as those shown in FIG. 2B, the microphone port opening 5 may be lower or more recessed than the surface of the channel. The depth of the recessed microphone port opening 5 may be dependent on the placement of the microphone on the circuit board within the electronic device.

Figure 3A:
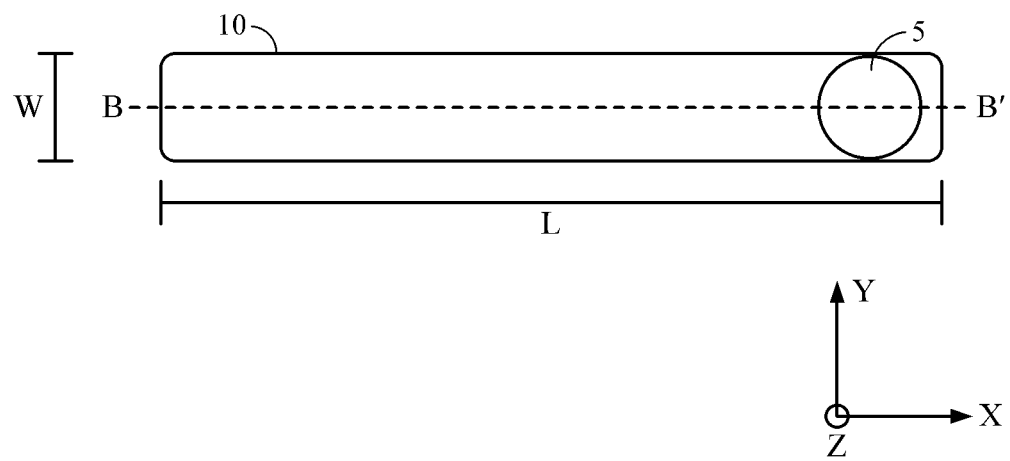
FIG. 3A is a schematic drawing illustrating a top view of another embodiment of a microphone port design with the microphone port disposed to one side.

A top view of another embodiment of a microphone port design for an electronic device can be seen in FIG. 3A. In this embodiment, the microphone port opening 5 is disposed to one side of the recessed channel 10. As shown, the microphone port opening 5 is disposed more to the right side of the recessed channel 10. In other embodiments, the microphone port opening 5 could be disposed to either side of the recessed channel 10. As discussed above with respect to FIG. 2A, the recessed channel 10 may have a length L' longer than the width W of an average human index finger. In some embodiments, the length L may be between about 0.75 inch and 1 inch. In other embodiments, the length L may be between 10 mm and 15 mm or between 10 mm and 25 mm. The recessed channel 10 may have a width W less than the length L. In some embodiments, the width W may be approximately $1/10^{th}$ of an inch. In other embodiments, the width W may be no greater than about ¼ of an inch.

Figure 3B:
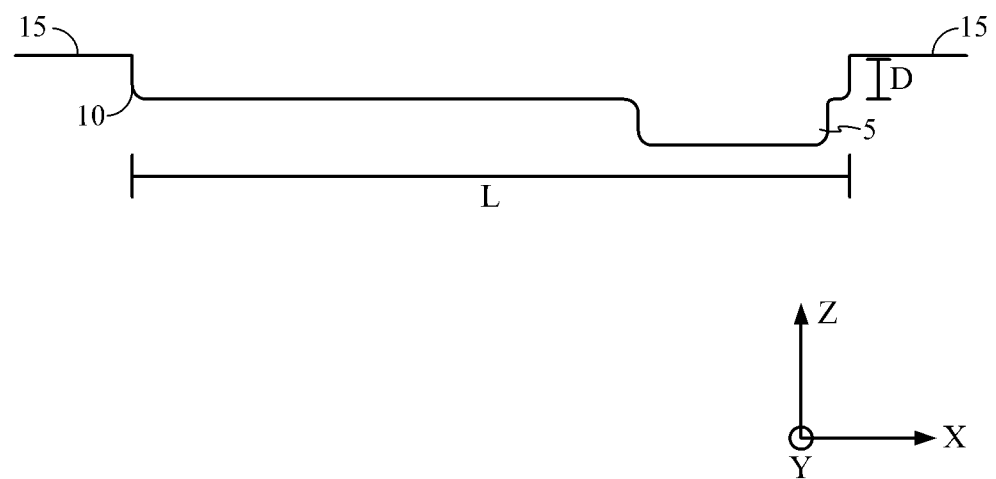
FIG. 3B is a schematic drawing illustrating a side cross-sectional view of the embodiment shown in FIG. 3A.

A side cross sectional view along line B-B' of the microphone port design of FIG. 3A is shown in FIG. 3B. As in FIG. 2B, the channel 10 is recessed a depth D from the outer surface 15 of the electronic device. The microphone port opening 5 is shown disposed to the right side of the recessed channel 10. In other embodiments, the microphone port opening 5 could be disposed at any point along the length of the recessed channel 10. The microphone port opening 5 is also shown recessed below the inner recessed surface of the channel 10. The microphone port opening 5 could be flush with the inner recessed surface of the channel 10 in other embodiments. As in the previous figures, the length L of the recessed channel is longer then the width W of an average human finger such that air is not trapped near the microphone port opening 5.

Figure 4A:
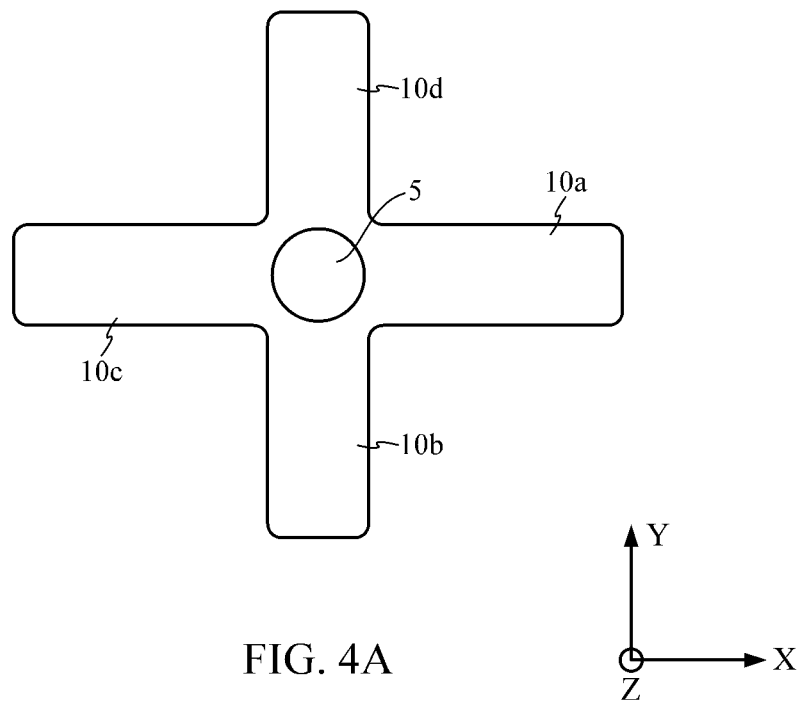
FIG. 4A is a schematic drawing illustrating a top view of another embodiment of a microphone port design having multiple intersecting channels.

In other embodiments, the microphone port design may include a plurality of intersecting channels, such as the design shown in FIG. 4A. In this top view, microphone port opening 5 is located at the intersection of two recessed channels having legs 10a, 10b, 10c, and 10d. As in the embodiments discussed above, the channels may be recessed a specified depth from the outer surface of the case of an electronic device. Each channel leg 10a, 10b, 10c, and 10d may have the same depth, length, and width or the dimensions of each channel leg 10a, 10b, 10c, and 10d may be different. The channel may intersect at a 90 degree angle as shown or at other angles ranging from 45 to 135 degrees in some embodiments. The microphone port opening 5 may be flush with the recessed surface of the channels or may be disposed below the recessed surface of the channels.

The overall length of each channel may be greater than the width of an average human finger to allow an exchange of air between the area surrounding the microphone port openings 5 and the external environment. In some embodiments, one channel may have a length shorter than the width of an average human finger, in which it may be completely covered by the user's finger. However, due to the intersection of the channels, air can escape to the external environment through the other channel. For example, a human finger may cover one of legs 10a, 10b, 10c, or 10d, but air could still escape to the external environment through one of the other legs. This arrangement provides similar advantages as a single channel having a length longer than an average human finger. In the illustrated example of intersecting channels, the overall area of the intersecting channels is larger than the size of an average human finger pad to prevent trapping air at the microphone port opening 5.

Figure 4B:
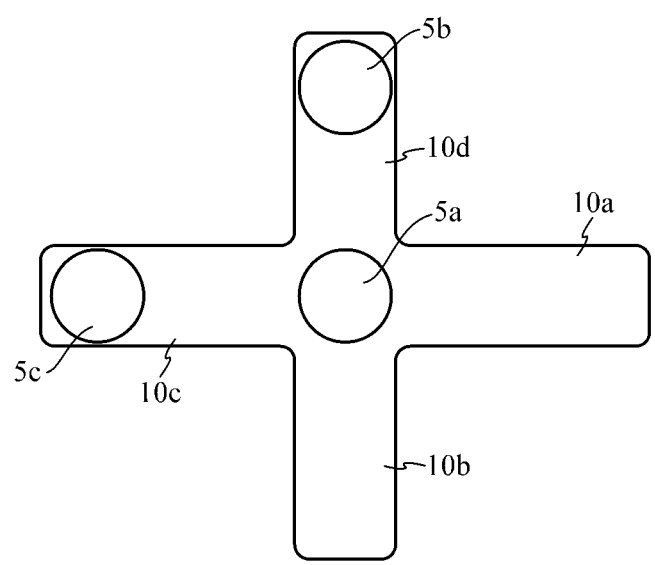
FIG. 4B is a schematic drawing illustrating a top view of another embodiment of a microphone port design having multiple microphones and multiple intersecting channels.

A microphone port design having multiple microphone port openings 5 forming a microphone array is shown in FIG. 4B. One microphone port opening 5a may be located at the intersection of two recessed channels, as discussed above with respect to FIG. 4A. Two additional microphone port openings 5b and 5c may be disposed toward the ends of the recessed channels in legs 10d and 10c respectively such that the microphone port openings 5a, 5b, and 5c form a 90 degree triangle. The microphone port openings 5b and 5c are shown on the left and top ends of the intersecting recessed channels, that is in legs 10d and 10c. In other embodiments, the microphone port openings 5b and 5c may be located in the right and bottom ends of the recessed channels (that is, in legs 10a and 10b) or in any other combination. The microphone port openings 5a, 5b, and 5c may be in a single line or they may form a ninety degree angle. The legs 10a, 10b, 10c, and 10d comprise one means for positioning a first, second, or third microphone port opening below an outer surface of an electronic device.

As discussed above, the microphone port openings 5a, 5b, and 5c may be flush with the recessed surface of the channels or they may be disposed below the recessed surface. The channels may have the same length, width, and depth dimensions or they may have different dimensions. The microphone port design shown in FIG. 4B prevents the accumulation of trapped air at any of the microphone port openings 5 even if one or more legs of the recessed channels are covered by an average human finger. The overall microphone port design shown is larger than the pad of an average human finger such that it is not easily entirely covered by a user's finger.

The microphone port opening 5a, 5b, and 5c may be located within the recessed channels at specified distances apart to allow the electronic device to perform beam forming. Beam forming, using an array of microphones, allows each microphone to focus on sounds that originate directly from a small area surrounding each microphone. Because of the narrow pickup field, the microphones tend to record less ambient and room echo noise than microphones with a larger field range. Beam forming technology based on known distances between microphones of an array provides improved sound isolation. The placement of an array of microphone port openings within a series of interconnected channels such that the microphone port openings form an L shape allows the electronic device to perform beam forming functions to decompose the incoming wavefronts of sound to span 360 degree space.

Figure 5A:
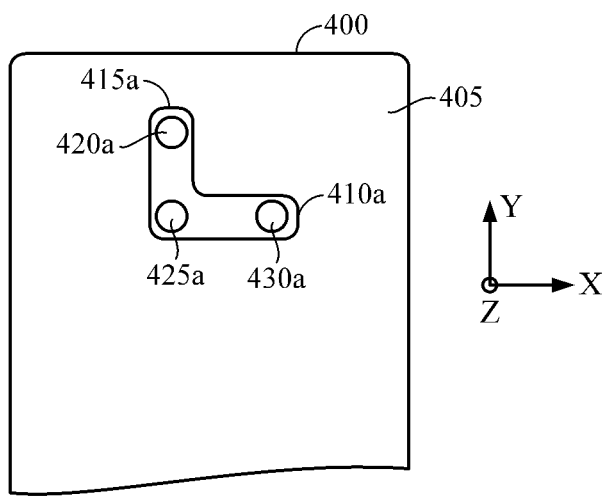
FIG. 5A is a schematic drawing illustrating a partial view of a case for an electronic device having an "L" shaped microphone port design with multiple microphones.

FIG. 5A illustrates one microphone port design for a case of an electronic device. The case 400 has an outer surface 405 configured with an "L" shaped recessed channel 412a. Three microphone port openings 420a, 425a, and 430a are placed in each corner of the "L" shaped recessed channel 412a. One microphone port opening 420a may be located closer to an end 415a of the recessed channel 412a while a second microphone port opening 430a may be located closer to an end 410a of the recessed channel 412a. A third microphone port opening 425a may be located at the intersection of the two legs of the "L" shaped channel 412a. As discussed above with respect to FIG. 4B, the placement of the three microphones allows the electronic device to perform beamforming to reduce ambient noise.

As with the other microphone port designs discussed above, the recessed channel 412a may have a length and width such that it cannot be fully covered by an average human finger. As long as one portion of the recessed channel 412a is exposed to the external environment, air will not remain trapped at the microphone port openings 420a, 425a, and 430a and therefore undesirable noise such as popping or scratching is reduced.

Figure 5B:
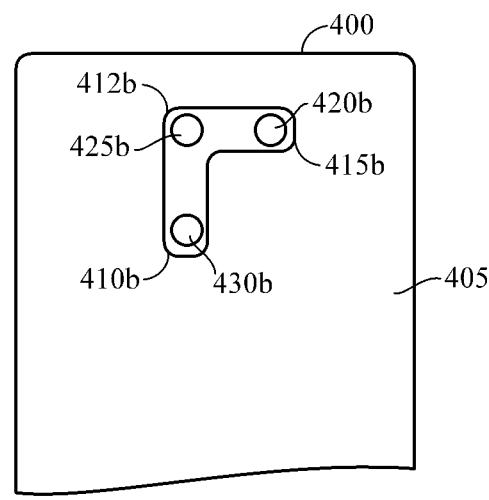
FIG. 5B is a schematic drawing illustrating an alternative orientation of a microphone port design.
Figure 5C:
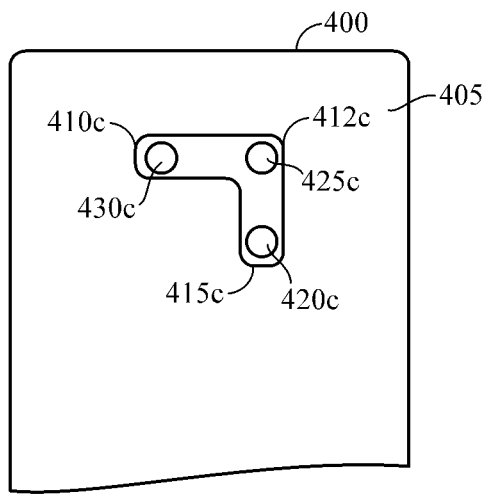
FIG. 5C is a schematic drawing illustrating a third orientation of a microphone port design.
Figure 5D:
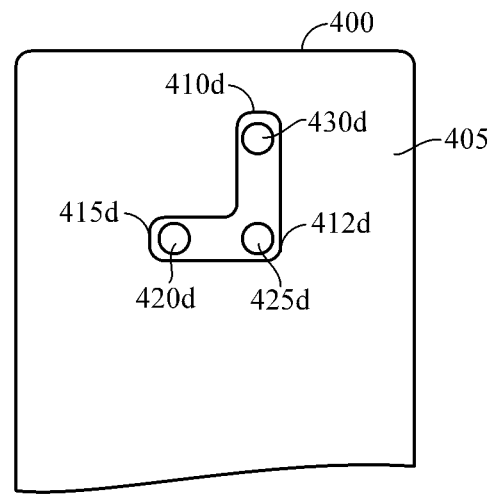
FIG. 5D is a schematic drawing illustrating a fourth orientation of a microphone port design.

The microphone port design of FIG. 5A is shown in various rotated configurations in FIGS. 5B, 5C, and 5D. Each of FIGS. 5B, 5C, and 5D shows the microphone port design of FIG. 5A rotated an additional 90 degrees. In all configurations, the microphone port design retains an "L" shape with the microphone port openings 420b-d, 425b-d, and 430b-d forming a ninety degree angle. In other embodiments, the "L" shaped microphone port design may be rotated any number of degrees between 0 and 360 degrees. Beam forming functions, as discussed above, may be performed if the microphone port openings 420a-d, 425a-d, and 430a-d form a ninety degree angle as shown in FIGS. 5A-5D.

Figure 6A:
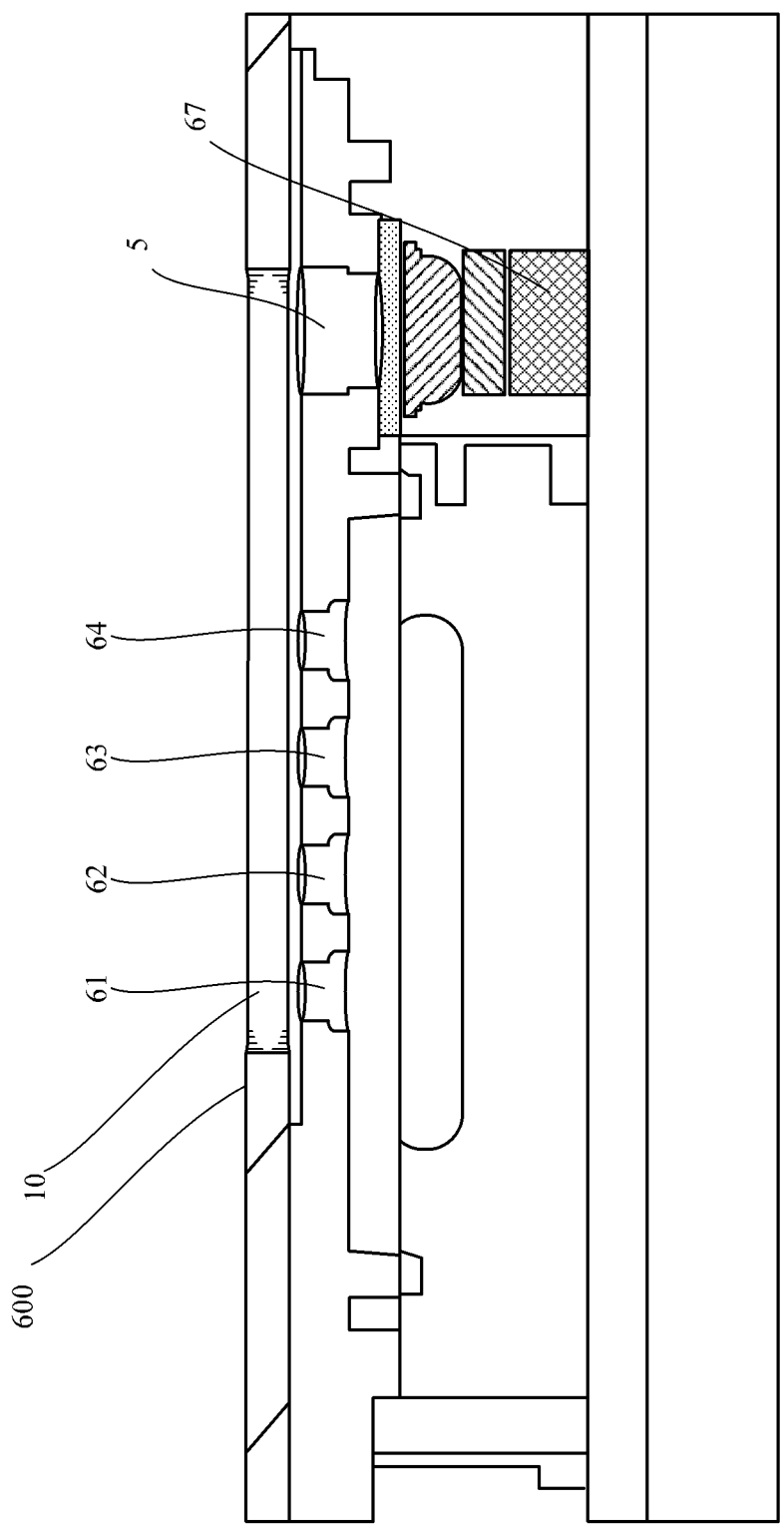
FIG. 6A is a schematic drawing illustrating an example of microphone port placement within an electronic device.

FIG. 6A illustrates a microphone porting from the edge of a camera assembly within an electronic device 600. In this cross-sectional view, the microphone port 5 is located at a depth within a channel 10. The microphone port 5 is disposed on one side of the channel 10. Furthermore, the microphone is porting from the edge of a camera assembly 67 within the electronic device. In some embodiments, additional openings 61, 62, 63, and 64 may be provided within the channel 10 over a receiver, such as that used for Active Noise Cancellation (ANC).

Figure 6B:
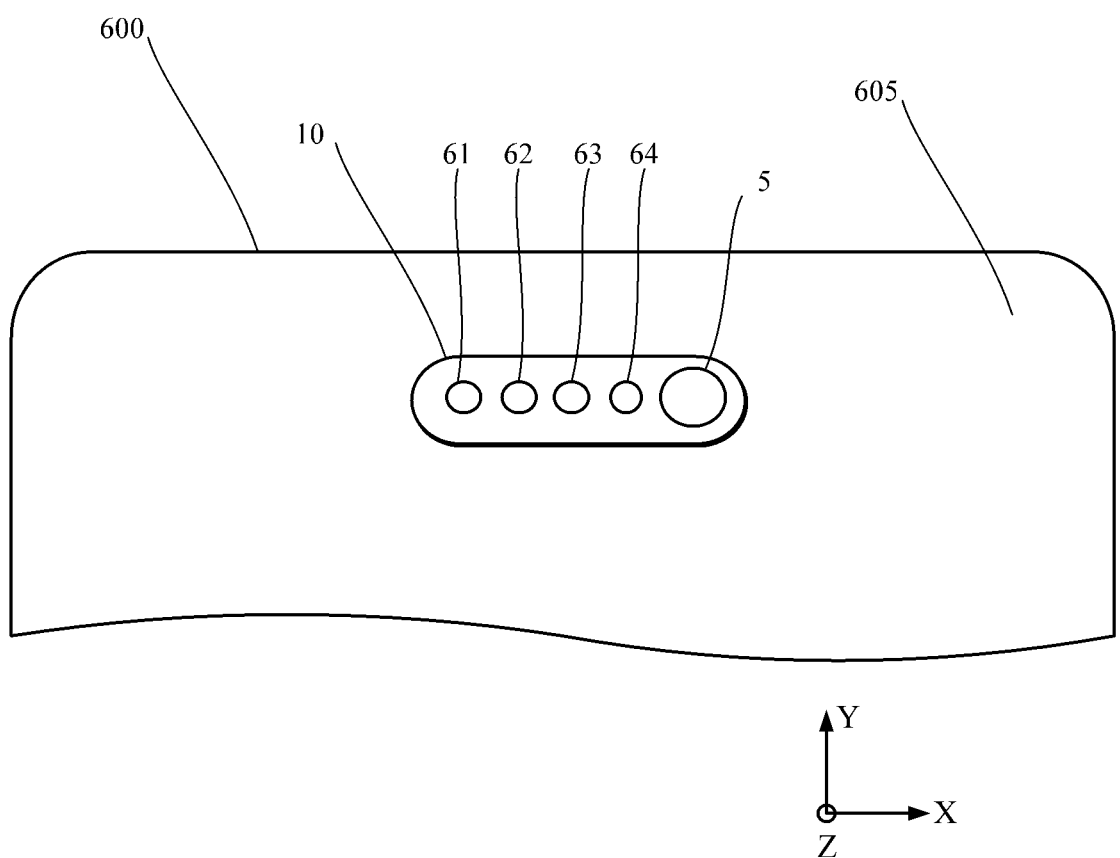
FIG. 6B is a schematic drawing of the back of an electronic device illustrating the microphone port placement in the embodiment shown in FIG. 6A.

A view of the back side of the device 600 may be seen in FIG. 6B. In this figure, the device 600 has a back surface 605 in which a channel or trench 10 is disposed. The microphone port 5 is shown disposed on one end of the trench 10. As discussed above, additional openings 61, 62, 63, and 64 may be disposed within the channel 10 to aid with active noise cancellation features of the electronic device 600.

Figure 7A:
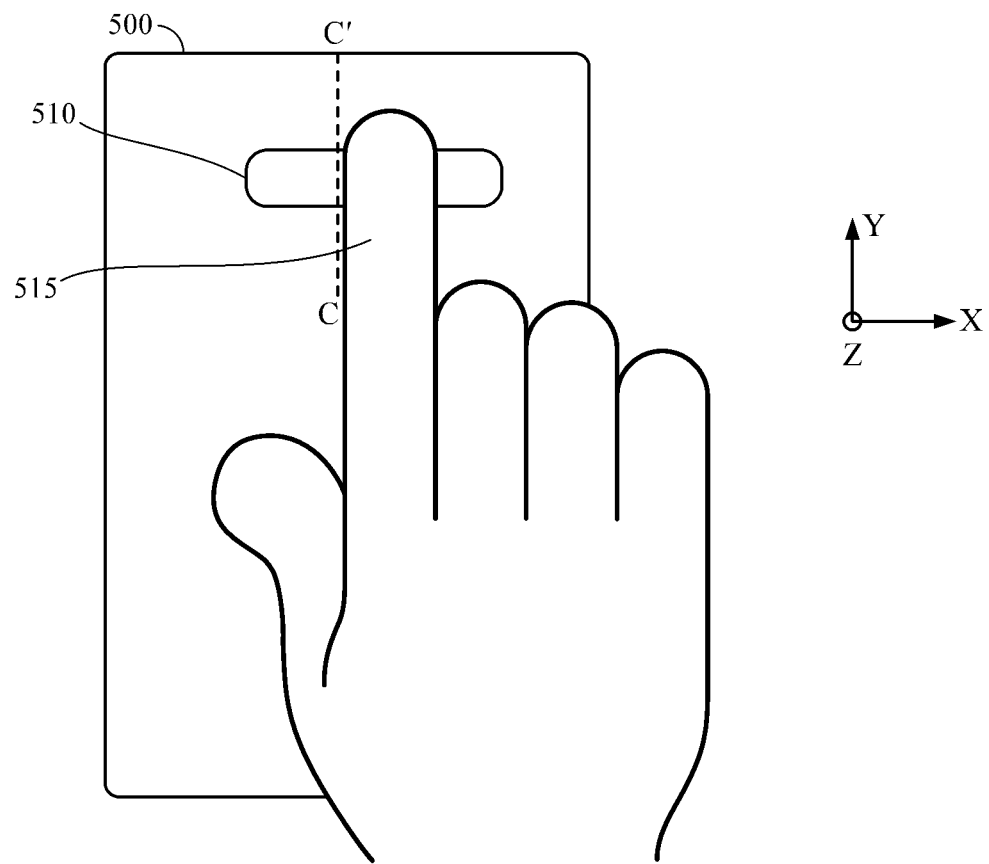
FIG. 7A is a schematic drawing illustrating an example of microphone port placement on an electronic device with a user's hand and finger.

One example of a microphone port design partially covered by an average human finger is shown in FIG. 7A. FIG. 7A illustrates a handheld device 500 with a microphone port design with a recessed channel 510 partially covered by a human finger 515. As shown, the human index finger is shown on the device surface above and partially covering the channel of the microphone port design 510. However, the finger 515 does not completely cover the entire length of the recessed channel 510.

Figure 7B:
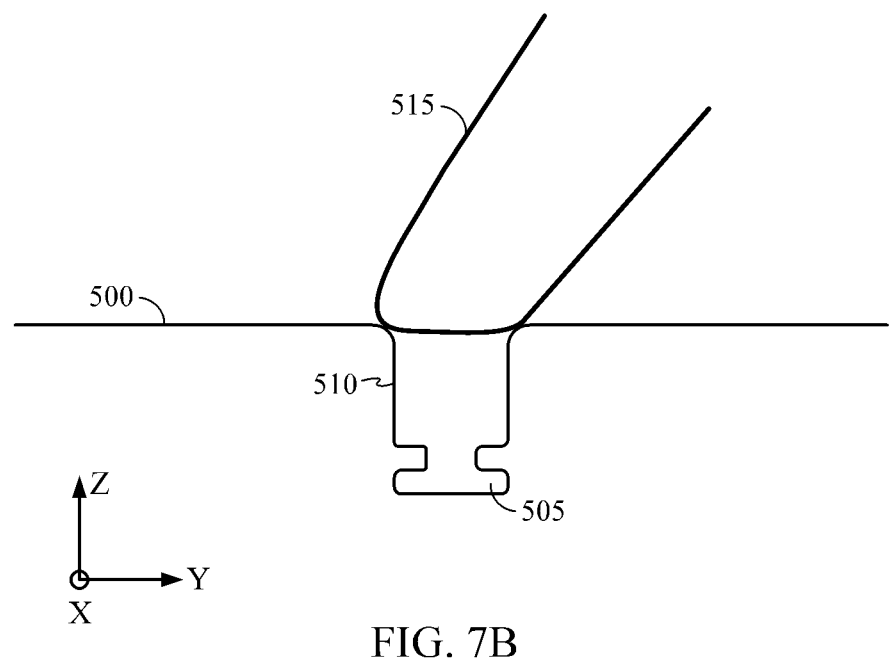
FIG. 7B is a schematic drawing showing a vertical section through line C-C' of the microphone port design of FIG. 7A.

A cross sectional view along line C-C' of the example of FIG. 7A is shown in FIG. 7B. Even though the finger 515 is blocking the microphone port opening in the Z-axis, by providing a channel 510 around the microphone port opening 505, sound can still propagate along the X-axis. This design may avoid complete microphone blockage and reduce finger scratching noise. As shown, the length of the recessed channel 510 oriented along the X-axis is longer than the width of the average width of a human finger such that air is allowed to escape from the area surrounding the microphone port opening. Additionally, the finger will not completely cover the microphone port opening in all three dimensions due to the small width of the channel 510 as compared to the dimensions of an average human index finger. Due to the narrow width of the channel 510, the majority of the area of the finger pad will rest on the surface of the device and will not be pressed into the channel. A wider channel may cause a portion of the microphone port opening 505 to be covered or blocked.

As shown in FIG. 7B, the microphone port opening 505 may be disposed within the channel such that the opening is not flush with the recessed surface of the channel 510. It may be advantageous to place the microphone port opening 505 at a greater depth from the device surface due to the microphone's placement within the circuitry of the electronic device. This can be done, for example, if the microphone is porting from the edge of a camera assembly within the electronic device, was discussed above with respect to FIG. 6A.

Experimental Results

A graphical representation of recorded scratch noise from a conventional microphone port design versus a microphone port disposed within a trench as discussed above is shown in FIG. 8. Experiments were conducted comparing a microphone port design shown in FIG. 1B, wherein the microphone port is disposed within a channel to a conventional microphone port design, such as that shown in FIG. 1A. In these experiments, the recorded scratch noise for the conventional microphone port design had a higher amplitude than the recorded scratch noise for the proposed microphone port design shown in FIG. 1B.

Figure 8:
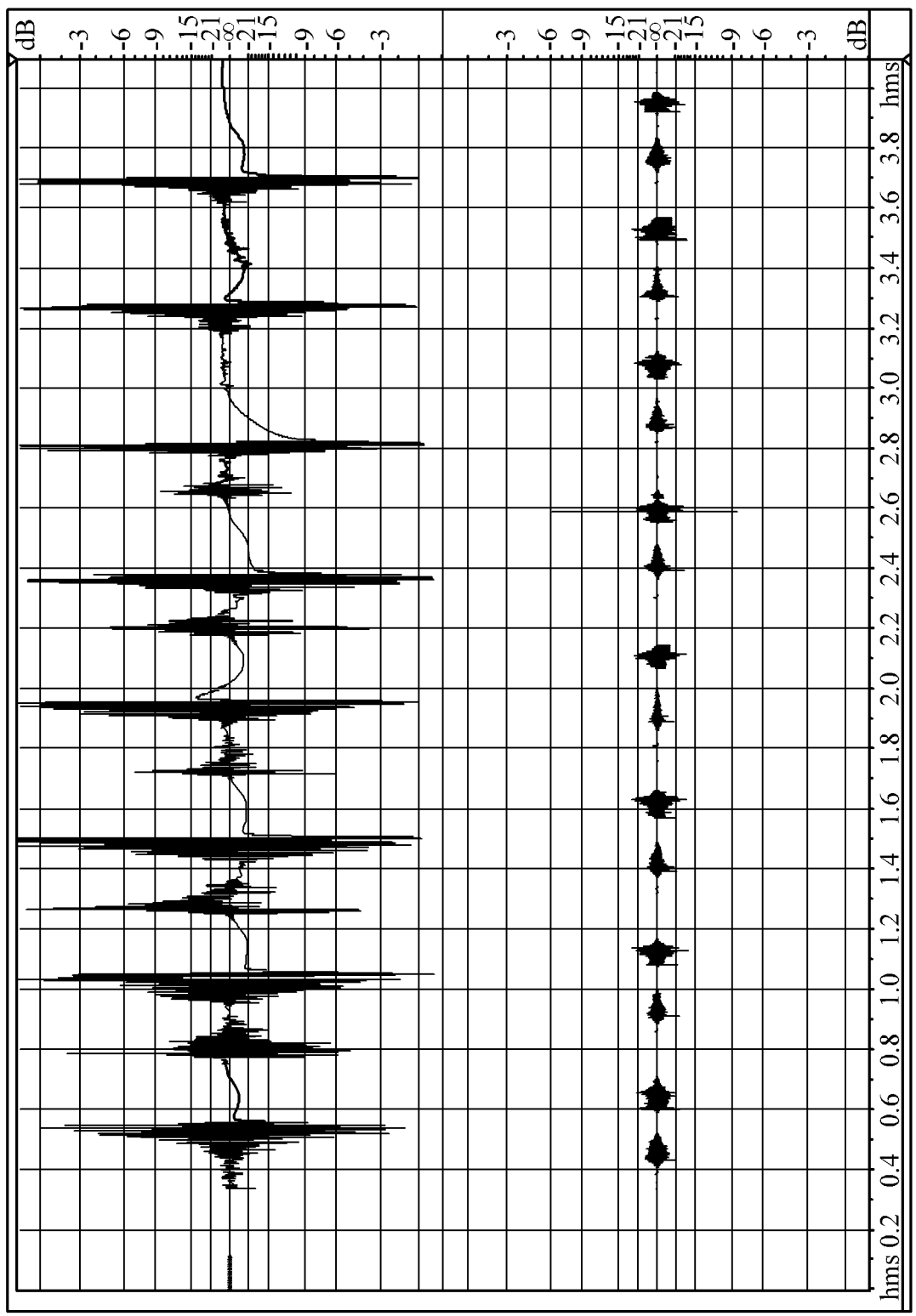
FIG. 8 is a graph showing the recorded scratch noise with conventional microphone porting and the recorded scratch noise with microphone porting according to one embodiment of the present invention.
Figure 9:
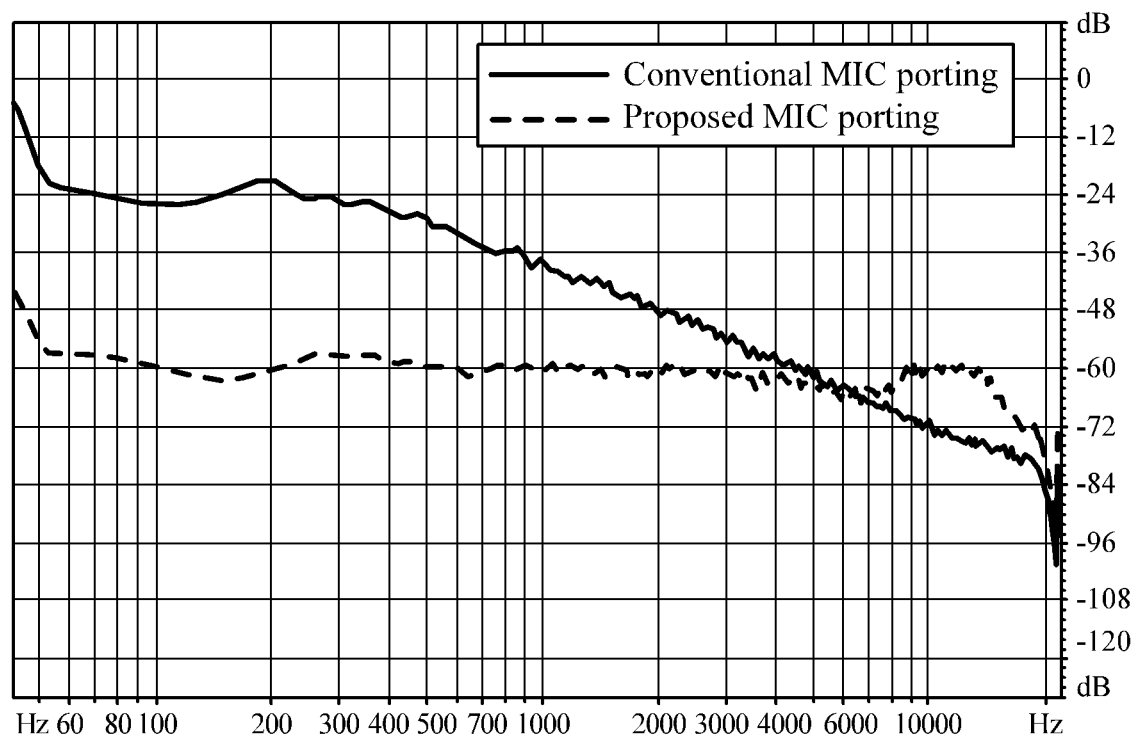
FIG. 9 is a graph showing the signal spectra of the recorded scratch noise shown in FIG. 8.

The spectra of the recorded scratch noise signals shown in FIG. 8 are shown in FIG. 9. As illustrated, a conventional microphone port design, such as that shown in FIG. 1A, generated a noise spectrum with a high amplitude near 0 Hz. This high amplitude signal noise can often saturate an active noise cancellation system. However, a microphone port design such as that shown in FIG. 1B generated a white noise spectrum with a lower amplitude near 0 Hz. This signal is much lower than a signal that may saturate an active noise cancellation system, resulting in a less irritating scratch noise signal to the user in comparison to the conventional microphone port design.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A handheld electronic device, comprising:
   a first surface;

at least one elongated channel recessed from the first surface and having a length, a width, and a depth such that the length is greater than the width and wherein the elongated channel comprises a recessed surface connected to the first surface through at least a pair of side walls extending between the recessed surface and the first surface along at least a portion of the width of the channel; and at least one microphone port located within the channel such that the microphone port is located below the recessed surface and not directly adjacent the pair of side walls.

2. The device of claim 1 wherein the length of the channel is greater than the depth.

3. The device of claim 1 wherein the depth of the channel is about one half the width of the channel.

4. The device of claim 1 wherein the at least one elongated channel comprises two channels.

5. The device of claim 1 wherein the at least one microphone port comprises two microphone ports disposed at opposite ends of the channel.

6. The device of claim 4, wherein the two channels are positioned 90 degrees relative to one another.

7. A handheld device, comprising:
a first surface having a first elongated channel oriented along a first axis of the device and a second elongated channel oriented along a second axis of the device such that the first channel and the second channel intersect;
a first microphone port located within the channels at the point of intersection of the channels;
a second microphone port located within the first elongated channel; and
a third microphone port located within the second elongated channel.

8. The device of claim 7, wherein the channels are configured such that the first microphone port and the second microphone port are located along a first line defined by the first elongated channel and the first port and the third port are located along a second line defined by the second elongated channel.

9. The device of claim 8, wherein the first and second lines intersect at a ninety degree angle.

10. The device of claim 7, wherein the channels are in an "L" shape, and wherein the first microphone is disposed at the intersection, the second microphone is located at a first end of the first channel, and the third microphone is disposed at an end of the second channel.

11. The device of claim 7, wherein the device is a cellphone or a tablet computer.

12. The device of claim 7, wherein the first surface is a rear surface of the device.

13. The device of claim 7, wherein the first elongated channel has a length that is greater than its width.

14. The device of claim 13, wherein the second elongated channel has a length greater than its width.

15. The device of claim 7, wherein the first elongated channel is a recessed channel in a front surface of the device.

16. An electronic device, comprising:
a first surface;
first means for reducing scratch noise into a first microphone positioned below the first surface;
second means for reducing scratch noise into a second microphone positioned below the first surface; and
third means for reducing scratch noise into a third microphone positioned below the first surface.

17. The electronic device of claim 16, wherein the first means for reducing scratch noise comprises an elongated channel formed in the first surface.

18. The electronic device of claim 16, wherein the second means for reducing scratch noise comprises an elongated channel formed in the first surface.

19. The electronic device of claim 16, wherein the first means for reducing scratch noise and the second means for reducing scratch noise comprise the same elongated channel formed in the first surface.

20. The electronic device of claim 19, wherein the elongated channel is formed in the first surface, which is a rear surface of the electronic device.

21. The device of claim 17, wherein the first means for reducing scratch noise further comprises a first microphone port recessed below the surface of the elongated channel.

* * * * *